Jan. 29, 1952     E. A. A. AXELSON     2,583,761
PIPE OR HOSE CONDUIT WITH HEATING MEANS
Filed May 4, 1949
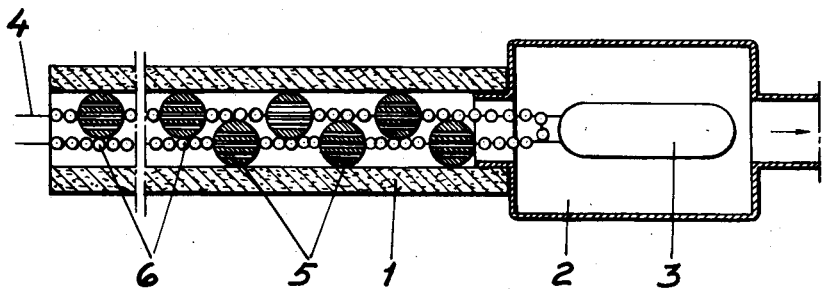
INVENTOR:
ESKIL A. A. AXELSON
BY: Haseltine, Lake & Co.
AGENTS Patented Jan. 29, 1952

2,583,761

UNITED STATES PATENT OFFICE 2,583,761

PIPE OR HOSE CONDUIT WITH HEATING MEANS

Eskil Anders August Axelson, Stockholm, Sweden

Application May 4, 1949, Serial No. 91,250
In Sweden June 29, 1948

4 Claims. (Cl. 219—39)

The present invention is particularly intended for use in connection with spray painting in cases when the spraying is to be effected with hot compressed air, or when the paint to be supplied to a spray pistol through a flexible hose must be heated. In order to heat for instance the compressed air intended to be used for the spraying, there was hitherto normally used a stationary electric air heater placed for instance on a wall in the spray room. The compressed air heated in this air heater is then conducted through a flexible hose to the spray pistol. The principal disadvantage of this heating method is that it takes a good deal of time to warm up the air heater proper, which contains a rather great mass, and therefore the operator will have to wait all that time until the compressed air is hot enough for the spraying to commence. When using this method, furthermore, the air becomes hottest nearest to the air heater and colder at the spray pistol, which means unnecessary heat losses if the hose is not particularly well heat insulated, in which case the paint becomes more viscous. For this reason the old method can be used in practice only for shorter hoses (about 2 metres) when the heat losses are small and no considerable heat insulation is necessary. If longer hoses are to be used, which is often the case, and a temperature of for instance 100° at the spray pistol is desired, there must according to the old method be chosen a very high initial temperature of the air leaving the air heater even if the hose is insulated, and a hose pipe capable of withstanding only 100° cannot be used, for which reason metal tubing must be used which, due to its ungainliness, is not practical for spray painting. The long hose, which is now to be heated to a rather high average temperature, also needs a long time for being heated, and this will delay the commencement of the work still further.

It is known already to impart a certain temperature to a fluid flowing under pressure in a flexible hose of rubber or the like by means of electrical resistance wires placed on the outside thereof or sealed into the walls of the rubber hose. As said walls must have a certain thickness in order to resist pressure, and rubber or other plastic materials moreover are bad heat conductors which, besides, can withstand only a certain temperature at the contact places between the heat transmitting medium, for instance for rubber about 100° C., the said method cannot be used in cases when fluids flowing within the conduit, for instance a rubber hose, must be heated to a temperature of about 100° C., since the rubber material in such case must be heated to a considerable higher temperature so that it can in turn heat the flowing fluid to said temperature.

The present invention, therefore, has for its object to heat a fluid flowing for instance in a rubber hose to the highest temperature tolerated by the rubber hose without risk that the heat transmitting medium, for instance electric resistance wires, which of course have a higher temperature, will damage the rubber hose. This effect is obtained thereby that for instance an electrically heated resistance wire is placed within the hose, without contacting the walls of the hose directly, but entirely surrounded by the fluid to be heated.

The invention is illustrated in the annexed drawing, which shows a longitudinal section through an example of a rubber hose provided with a heating device according to the invention.

Referring now to the drawing, 1 designates a rubber hose provided with an expansion 2 at the mouth end thereof, said expansion housing a thermostat 3 which directly or via a relay closes and opens respectively, the circuit including resistance wire 4 connected to an electrical current source. Spacing means, for example, insulating beads 5, 6 are threaded on the resistance wire, which forms a single coil within the rubber hose 1, entering and leaving the hose at the same end thereof. Said insulating beads may have any suitable shape and may be provided with channels or holes paralleling the axis of the hose.

In the current circuit there may be included a switch to close and open the circuit in response to the pressure prevailing in the tube or hose pipe.

In order that the heat transmission to the fluid flowing through the hose may be as effective as possible, some of the beads 5 are larger than the others 6. The smaller beads 6, similarly to the resistance wire do not touch the walls of the hose, and due to their inferior size they will have a relatively higher temperature. Consequently they will indirectly constitute the substantial heat transmitting medium, simultaneously keeping the larger beads 5 in a predetermined position. The larger beads, on the other hand, having a relatively large surface, though due to their round shape they have a relatively small contact surface with the inner wall of the hose will receive approximately the same temperature as the flowing fluid, and therefore they will not damage the hose.

Since the fluid flows in the direction of the arrow, the highest temperature will be prevailing in the recess, and the thermostat therefore may be adjusted for the desirable temperature, for instance 100° C. or the highest temperature which the hose will stand.

The use of the invention described above offers a number of advantages.

The time needed for heating compressed air for example is short because the resistance wire becomes hot nearly immediately after the electric current has been switched on.

Since the heating takes place within the air hose and the temperature of the air increases all the time during the flow through the hose and does not attain the desired value until the air reaches the farther end of the hose where it is to be discharged and where a thermostat is placed, the hose may have practically any length desired. In order to avoid unneeded heat losses, the heating preferably may take place only along the last 3—4 metres of the hose.

Placing the heat transmitting medium within the flowing fluid and the combination with a thermostat allows a fluid flowing within a flexible hose to be heated to the highest temperature tolerated by the hose, without risk that the heat transmitting medium, which of course has a higher temperature, will damage said hose.

As the return conductor for the current in the resistance wire may also be placed within the same hose and since means may be provided including a pressure responsive element whereby the circuit remains open until the fluid in the hose is compressed and flows, such a heating method may also be regarded as explosion-proof, which is often necessary when spray painting.

Having now described my invention, what I claim as new and desire to secure by Letters Patent is:

1. A device for conveying a fluid between a supply point and a delivery point and maintaining an elevated temperature in the fluid comprising a flexible hose, a resistance wire disposed longitudinally within the inner space of the hose in direct contact with the fluid, means holding the wire in spaced relationship to the inner surface of the hose, a thermostat arranged within the hose, a supply circuit for the wire, a switch in the circuit, and a relay operatively connecting the thermostat to the switch thereby to control the operation of the switch in response to the temperature at the thermostat.

2. A device as in claim 1 wherein the means holding the wire in spaced relationship to the inner surface of the hose comprise insulating beads threaded on the wire, at least some of the beads having channels therethrough parallel to the axis of the hose.

3. Device according to claim 1 further comprising a pressure responsive member arranged within the conduit, and an operative connection between the member and switch whereby the circuit is respectively closed and opened in response to a rise or fall of pressure inside the conduit.

4. A device as in claim 1 wherein the means holding the wire in spaced relationship to the inner surface of the hose comprise axially spaced elements mounted on and extending radially from the wire and having channels therethrough defining a continuous passage substantially parallel to the axis of the wire.

ESKIL ANDERS AUGUST AXELSON.

REFERENCES CITED

The following references are of record in the file of this patent:

UNITED STATES PATENTS

| Number | Name | Date |
|---|---|---|
| 937,435 | Guay | Oct. 19, 1909 |
| 1,472,197 | Sutherland | Oct. 30, 1923 |
| 1,644,966 | Weski | Oct. 11, 1927 |
| 1,699,323 | Apfel | Jan. 15, 1929 |
| 1,905,343 | Carpenter | Apr. 25, 1933 |
| 1,960,603 | Twombly | May 29, 1934 |
| 1,995,302 | Goldstein | Mar. 26, 1935 |